United States Patent [19]

Piret et al.

[11] 4,131,454

[45] Dec. 26, 1978

[54] PROCESS FOR RECOVERING SILVER AND GOLD FROM CHLORIDE SOLUTIONS

[75] Inventors: Norbert L. Piret; Meinolf Höpper; Herbert Kudelka, all of Duisburg, Germany

[73] Assignee: Duisburger Kupferhütte, Duisburg, Germany

[21] Appl. No.: 847,888

[22] Filed: Nov. 2, 1977

[30] Foreign Application Priority Data

Dec. 11, 1976 [DE] Fed. Rep. of Germany ....... 2656233

[51] Int. Cl.$^2$ ........................................... C22B 11/04
[52] U.S. Cl. ......................................... 75/83; 75/108; 75/118 R; 423/25; 423/38; 423/46
[58] Field of Search ..................... 75/118 R, 108, 117, 75/120, 83; 423/25, 38, 46

[56] References Cited

U.S. PATENT DOCUMENTS

| | | | |
|---|---|---|---|
| 1,343,153 | 6/1920 | Ossa | 423/38 X |
| 2,478,652 | 8/1949 | Byler et al. | 75/118 R |
| 2,614,029 | 10/1952 | Moede | 423/25 |
| 3,625,674 | 12/1971 | Jacobs | 75/118 R |
| 3,834,896 | 9/1974 | Eisele et al. | 75/118 R |
| 3,957,505 | 5/1976 | Homick et al. | 75/118 R |
| 4,029,494 | 6/1977 | Kapenen et al. | 75/83 X |

*Primary Examiner*—G. Ozaki
*Attorney, Agent, or Firm*—Sprung, Felfe, Horn, Lynch & Kramer

[57] ABSTRACT

Process for selectively separating precious metal such as silver and gold from a chloride solution of the precious metals and other heavy metals which involves:

(a) adding finely divided activated carbon to the solution for reduction of gold to gold metal and absorption of the gold metal by the carbon, (b) adding an aqueous solution of an iodine compound for selective precipitation of further precious metal including the silver, if present.

During steps (a) and (b) the pH is below 3 so that hydrolysis with the metal ions does not occur, and the potential of the solution during step (b) is such that no substantial decomposition of the iodine compound occurs. The precipitated precious metal and active carbon are separated, dried, and admixed with an iodine binder, and the resulting admixture is subjected to reduction for formation of a regulus containing the precious metal.

23 Claims, 1 Drawing Figure

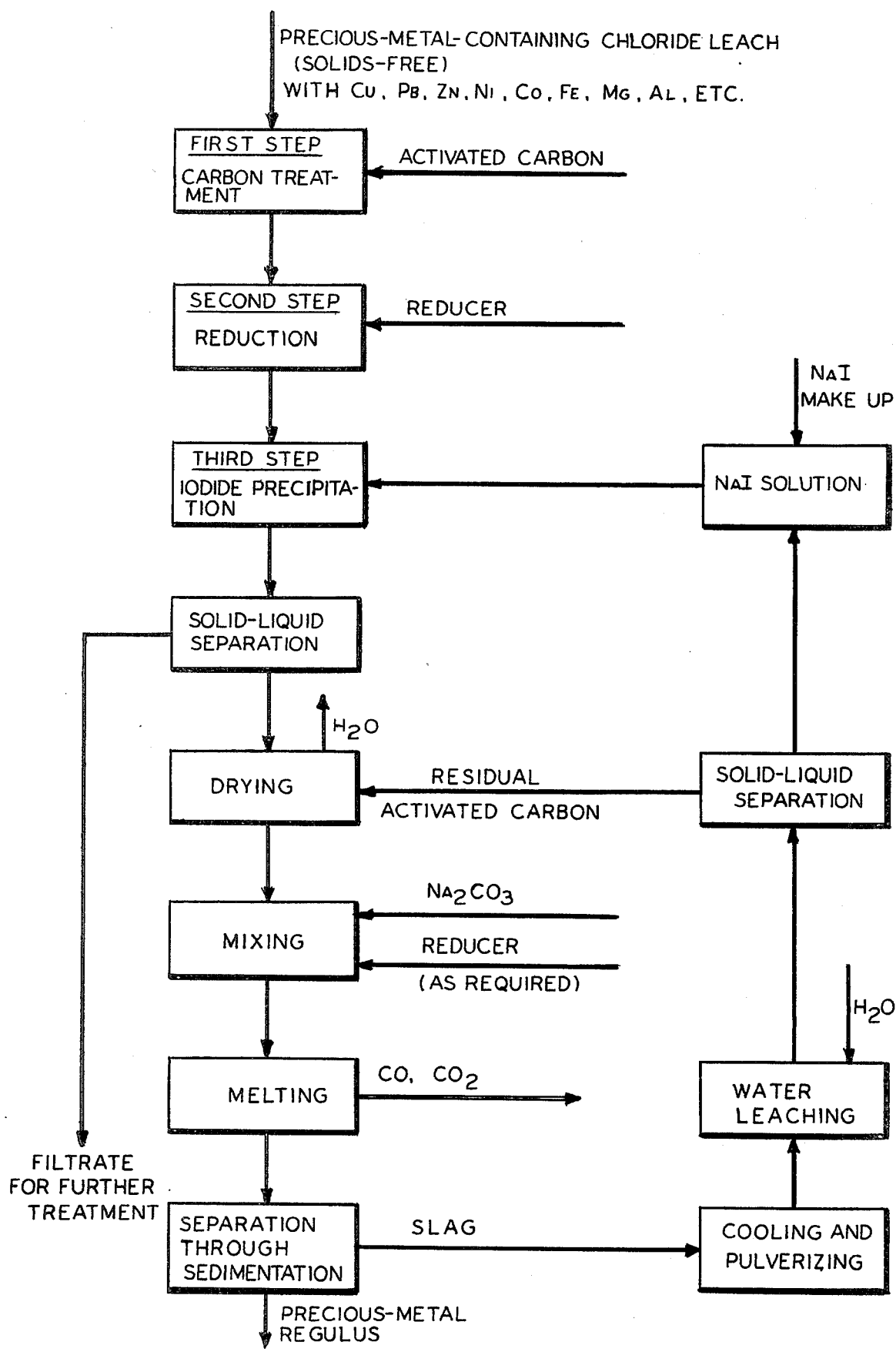

PROCESS FOR RECOVERING SILVER AND GOLD FROM CHLORIDE SOLUTIONS

BACKGROUND

The present invention is concerned with a process for selectively separating and recovering silver and/or gold from predominantly chloride solutions which may contain as main constituents further heavy metals such as, for example, zinc, nickel, cobalt, iron, magnesium, and/or aluminum.

Such solutions are obtained, first, in the primary wet chemical treatment of sulphide non-ferrous-metal-containing concentrations, stones, and similar sulphide starting materials. For the purpose of recovering the non-ferrous metals, these materials are subjected to oxidizing leaching in predominantly chloride solutions. $O_2$, $Cl_2$, $Fe^{3+}$, $Cu^{2+}$, etc., may be used as oxidizing agents. Ferric chloride leaching of copper concentrates in an alkali or alkaline earth metal chloride solution is an example of the wet chemical method of treating sulphide concentrates. This method cannot prevent considerable amounts of silver, e.g. 60% of the silver in the starting material, being dissolved in addition to the copper and the iron (see U.S. Bur. Mines, Rept. Invest. 7474).

Secondly, such solutions are also obtained in the wet chemical further treatment of leach residues which are formed in the primary hydrometallurgical treatment of non-ferrous metal concentrates, e.g. in the sulphatizing roasting of sulphide copper concentrates and of complex concentrates, or in the electrowinning of zinc from zinc blende concentrates. Besides the non-ferrous metal residues not extracted, these leach residues often contain other metals which cannot be extracted during the primary extraction process, e.g. lead, silver, and gold. In many cases, the further treatment of these residues for recovering these metals still contained is required or attractive because of either the high metal value content or the higher metal yield. One way of treating these leach residues in the wet chemical manner is described in DT-OS 20 60 408 where the residue is leached in a predominantly chloride solution, with an oxidizing agent, e.g. $Cl_2$, being added if necessary.

Thirdly, such solutions are also obtained in the treatment of pyrites cinders which, for the purpose of producing iron ore, are subjected to chlorinating sulphatizing roasting with subsequenet leaching, or in the working up of non-ferrous-metal-containing leaching residues by means of chlorinating sulphatizing roasting (see DT-OS 24 28 793).

The chloride sulphate solutions, thus formed, generally contain the non-ferrous metals Cu, Zn, Co, Ni, Ag, and, as is well known, gold, too, if $Cl_2$ is introduced during the leaching step.

Fourthly, such solutions are also obtained by the anodic oxidation of precious-metal-containing metal anodes in chloride or in chloride sulphate solutions. As is well known, during nickel refining electrolysis there are anodically dissolved in the Hybinette cell considerable amounts of silver together with nickel and other impurities.

There are known to be various methods of working up the solutions thus obtained.

There are various ways of working up the solutions obtained by the processes first mentioned above.

In a first process the precious metals, particularly the silver, from a Cu-containing chloride solution are cemented by means of metallic iron together with the copper. The cement copper, thus obtained, must be subjected to an electrorefining step for the purpose of recovering the silver and electrolytic copper (see U.S. Bur. Mines, Rept. Invest. 7474).

In another process, a cupriferous chloride solution is first subjected after leaching to partial preliminary reduction prior to being partly decopperized with diaphragm cells during electrowinning. Thus there is obtained a silver-containing copper powder which, as in the process mentioned previously, must be subjected to another refining step (see U.S. Pat. No. 3,785,944; U.S. Bur. Mines, Rept. Invest. 8007).

In both processes it is impossible for the silver to be selectively recovered or, because of the presence of the silver, for copper of electrolytic copper quality to be recovered by means of simple pyrometallurgical refining. Hence, the copper must be subjected to additional electrorefining at considerable cost.

In another process, the cupriferous chloride solution is treated, after leaching, with cement copper in order to reduce the cupric ions contained therein. Thus, the elements selenium, tellurium, bismuth, lead, and silver are at least partly separated from the cuprous chloride solution (see U.S. Pat. No. 3,798,026). As the silver in this concentrated chloride solution is present as a silver chloride complex, the cementation of the silver is incomplete even if there is a high excess of metallic copper.

For the purpose of working up the solutions which were the second group to be mentioned above, various processes have been developed for recovering the non-ferrous metals contained therein, particularly lead, silver, and, possibly, gold.

According to one of these processes, the lead and, simultaneously, the non-ferrous metals are removed from the solution by means of precipitation as Pb(OH)Cl, with a neutralizing agent, e.g. lime water, being added (see DT-OS 25 00 453), or by means of precipitation as $PbCO_3$, with soda being added. A reducer being added, the precipitate is remelted to base bullion. This process does not represent any selective recovery of silver and gold as against lead, so that the base bullion has to be subjected to a further refining step.

According to another process, the silver, together with the copper, is selectively precipitated as against the lead in the form of sulphide, with hydrogen sulphide being added; it is then separated from the solution (see Belgian Pat. No. 839,867). This process is characterized by a selective separation of the silver as against the lead, but not as against the copper.

An alternative to the above-mentioned processes is offered by cementation of the non-ferrous metals with the aid of either iron dust (see Erzmetall 29, 1976, 2, pp. 73-75) or lead metal (see DT-OS 20 60 408) or zinc dust. However, this cementation is not selective as against copper. If it is carried out with lead metal or in the presence of lead, the cementate contains no inconsiderable amount of lead.

For the purpose of working up the third group of solutions mentioned above, cementation with metallic iron is generally applied, with the precious metals and the cement copper being recovered simultaneously. A well known alternative to this cementation is offered by the reduction of the solutions with cement copper, with the bulk of the copper being precipitated as cuprous chloride. The residual copper is cemented with iron.

The precious metals are thus conveyed into the cuprous chloride (see Lehrbuch der Metallhuttenkunde, Vol. 1, by V. Tafel, 1951, page 529).

Hence, the above-mentioned processes do not effect any selective recovery of the precious metals or any recovery of an intermediate copper product free from precious metals.

According to a process for recovering an intermediate copper product freed from the silver, the solution from the working up of pyrites cinders according to the process of chlorinating sulphatizing roasting is treated with a water-soluble iodide solution, e.g. KI or $ZnI_2$ (see Claudet, British patent 1870, No. 282). The precipitate with the silver as silver iodide has the disadvantage of also containing considerable amounts of copper (see British patent 1870, No. 282) and considerable amounts of lead (see H. Wedding in Eisenhüttenkunde Vol. 2, 1902, pages 513-514). Hence, there is no selectivity of this silver recovery as against the copper and the lead. Besides, there is no information on the behaviour of the gold in this process because, on the one hand, the gold should be present as colloidal gold on account of being easily reducible and, hence, hardly capable of being effectively subjected to any solid-liquid separation, while on the other hand, gold, in the presence of an excess of iodide ions, has a tendency towards being dissolved again through the formation of complexes. Besides, as there is to be no previous reduction step, the iodide is additionally used as a reducer, which is a burden to the economy of the process seeing that there is no recovering of the iodide used for reduction. Thus, the process described has three quite considerable disadvantages.

For the purpose of working up the fourth group of solutions mentioned above, there is a well-known process cementing the silver with copper powder from the nickel chloride and sulphate solution. The disadvantage is that a considerable excess of copper has to be used for a quantitative removal of the silver, there being obtained a cementate predominantly containing copper but comparatively little silver.

Moreover, for the purpose of selectively recovering precious metals from predominantly chloride solutions, there have been described processes which are based on the principle of ion exchange.

For the purpose of extracting the gold, DT-AS 15 33 131 and DT-AS 19 64 922 recommend the use of an anion exchange resin with different chelate-forming groups. These processes, it is true, do extract the gold from the solution selectively, but they do not bind the silver. Moreover, on account of the strong bond, it is difficult for the gold to be eluted from the ion exchange, so that, in order to recover the gold, the ion exchanger has to be decomposed.

According to another well-known process, the precious metals gold and silver can be selectively extracted from a chloride solution by means of the solution being conveyed via an ion exchanger with SH groups. This process, however, has the following disadvantages: first, the solution must not contain any free chlorine because, on account of that, the ion exchanger would be decomposed. As, on the other hand, gold is easily reducible in the absence of chlorine, the one requirement excludes the other. The second disadvantage is the heavy complex formation of silver in chloride solution, which is the reason why the ion exchanger can only be charged with a low amount of silver. Thirdly, the conditions of eluting the silver and the gold vary very much.

The use of activated carbon for absorbing the gold from different solutions is also well known. It is impossible for the required low gold concentration in the final solution to be obtained from chloride solutions even if there is a considerable excess of most finely divided activated carbon.

All the processes described so far have one or more of the disadvantages as follows: a lack of selectivity as against the accompanying elements; incomplete recovery of the precious metals; the varying behaviour of the precious metals to be recovered towards the process applied; and the complicated and/or uneconomical further treatment of the precious metals.

The Invention

It has now been found that these disadvantages do not occur if, for the purpose of separating and recovering the silver and/or gold from a predominantly chloride solution containing other heavy metals as main constituents, the said solution is subjected to a three-step treatment at a pH value at which no products of hydrolysis can be formed; thus, in the first step of the gold concentration, correspondingly finely divided activated carbon is added; in the second step the addition of reducer is so proportioned as to maintain a suitable potential; in the third step an aqueous solution of an iodide compound is added at a temperature at which the solubility of the precious-metal-containing precipitate, being formed, is sufficiently low, with the suspension subsequently being stirred, with the precious metals, selectively precipitated as against the metal ions present, and the activated carbon jointly being separated from the chloride solution, with this precipitate being dried and subsequently admixed with a suitable iodide bonder for the purpose of recovering the iodide compound, and, finally, with the precipitate being subjected in the known manner to reduction melting, which results in a precious metal regulus being recovered.

For the most part, copper and/or lead are present as main constituents in the said solutions obtained; in addition, there often are varying amounts of other metal ions, e.g. zinc, nickel, cobalt, iron, magnesium, and aluminum. If sulphates are present in the starting material, the predominantly chloride solution also contains sulphate ions depending upon the solubility of the sulphate in the chloride solution.

The process in accordance with the present invention assumes that the solution to be worked up is practically free from solids or is made free from solids.

It is well known that in order to keep in solution any gold that may be present, the oxidation potential of the solution must be sufficiently high, which is effected through the presence in the solution of a concentration, however low, of free chlorine.

During the three-step treatment the pH value of the cloride solution is below the pH value at which the metal ions present begin to hydrolize. As a rule, the pH value will always amount to below 3, preferably between 1 and 2.

In the first step, this solution has added to it a certain amount of finely divided activated carbon. The amount added is at least 5, preferably 10 to 30 times (wt. basis) the gold concentration in the solution. As a result of this addition there occurs a lowering of the potential on account of the decomposition of the free chlorine, with part of the gold in solution being reduced to metal. The effect of this addition is that the proportion of metallic gold thus formed is not present in the solution as finely divided or colloidal gold, which would have an unfavourable effect upon subsequent separation of solids from the solution, but that this proportion is absorbed during reduction by the readily filterable activated carbon. Hence, there is ensured a solid-lquid separation that can be carried out easily.

After activated carbon being added, the solution still possesses a certain oxidation capacity depending upon the kind and composition of the solution and marked by the potential of the solution. Generally speaking, the potential is too high. Therefore, in the second step the oxidation capacity of the solution is decreased by the addition of a reducer which, after the reduction process, leaves either no solid residue at all or only such as is not worth mentioning. Sulphur dioxide, zinc dust, and iron dust, for example, are highly suitable reducers. By means of adding the reducer the oxidation capacity of the solution is decreased to such an extent that in the subsequent third step, in which an aqueous solution of an iodide compound is added, there occurs no oxidation of the iodide ion worth mentioning, e.g. to elemental iodine.

Should the oxidation capacity of the chloride solution containing suspended activated carbon, already be sufficiently low after the first step, there can, of course, be used as a reducer the aqueous solution of the iodide compound used in the subsequent third step, seeing that in this case there occurs only insignificant oxidation of the iodide ion, which, on account of the low consumption of iodide, hardly impairs the economy of the process.

After the second step the chloride solution, containing suspended activated carbon, possesses such a potential that, if iodide is added, this iodide is hardly oxidized by such oxidizing constituents as may still be present. However, this potential cannot be determined exactly since it depends upon the kind and composition of the solution.

In the third step an aqueous solution of an iodide compound is added to the suspension. Thus the silver is precipitated as silver iodide. In order to effect an extensive removal of the silver it is necessary for the temperature to be low because the final concentration of the silver in the solution increases with rising temperatures on account of the known dependance of the solubility of silver iodide upon temperature, as can be seen from the following thermodynamic data on solubility in water (see Gmelin, Silber, Vol. 2, 1972, page 300):

| Temperature t° C | 12 | 22 | 30 | 42 |
|---|---|---|---|---|
| Solubility Product $K_s = (Ag^+) \cdot (I^-)$ | $10^{-16.53}$ | $10^{-15.80}$ | $10^{-15.20}$ | $10^{-14.46}$ |
| Temperature t° C | 55 | 63 | 87 | |
| Solubility Product $K_s = (Ag^+) \cdot (I^-)$ | $10^{-14.07}$ | $10^{-13.63}$ | $10^{-12.65}$ | |

Therefore, 50° C. should not be exceeded in the third step. Conveniently, the temperature is best between 40° C. and the crystallization temperature of the solution, that is to say, prior to the third step the temperature of the solution, containing activated carbon, must be decreased to the temperature desired. The point at which this temperature decrease occurs in the process, e.g. prior to the first step, described above, or subsequent to the second step, is irrelevant to the process in accordance with the present invention.

The iodide compound, preferably used for the production of the aqueous iodide solution used in the third step, is an alkali-iodide compound, e.g. NaI or KI. The amount of iodide added is 100 to 150%, preferably 110 to 120%, of the stoichiometry, related to silver in accordance with Reaction (1):

$$Ag^+ + I^- \rightarrow AgI \downarrow \qquad (1)$$

The addition of a stoichiometric amount of iodide higher than 150% is inconvenient to the process because it leads to the silver being dissolved again owing to the complex formation in the chloride solution particularly as $(AgCl_2I)^{2-}$ (see Gmelin, Silber, Vol. 2, 1972, p. 302).

The dissolved gold, which may still be present in the suspension, is removed from the solution in the third step to below a final gold concentration of 0.02 mg/l. While a not inconsiderable part of the gold has already been removed from the solution in the first step or in the second, the residual gold content, i.e. that which is the most difficult to remove, is separated from the solution only in the third step of the process in accordance with the present invention by means of iodide being added, with this gold being conveyed into the precipitate as a hardly soluble iodide compound (according to $K_s = (Au^+) \cdot (I^-) = 10^{-22}$). As, on the other hand, it is well known (see U.S. Pat. No. 3,957,505) that, in the presence of an excess of iodide ions, gold can be conveyed into solution as a complex, it is necessary for the amount of iodide, added in the third step, to be limited. For this reason it is convenient to add in the third step only a small excess of iodide, e.g. 110 to 120% of the stoichiometric amount related to silver according to Reaction (I).

If the chloride starting solution should contain gold as the only precious metal, the amount of iodide, added in the third step of the process in accordance with the present invention, is preferably no more than 100%, preferably 50–100%, stoichiometrically related to gold, because of the gold iodide complex formation in the presence of an excess of iodide.

However, the removal of the silver and/or gold from the chloride solution by the process in accordance with the present invention is not only quantitative, but also selective.

The selectivity of precious-metal separation as against copper is achieved in predominantly cupriferous chloride solutions by means of the precious-metal-containing chloride copper solution being reduced in the second step only to such an extent that the decomposition of the iodide ion, added in the third step, is only just prevented from taking place, and, this potential having been reached, by means of 100 to 150%, preferably 110 to 120%, of the stoichiometric amount of iodide, related to silver, being added in the third step.

The effect of this is that, on the one hand, the cuprous ion concentration and, on the other hand, the excess of iodide in the solution remain low, so that according to the solubility products $$K_{s_{Ag(I)}} = (Ag^+) \cdot (I^-) = 10^{-15.8}$$

$$K_{s_{Cu(I)}} = (Cu^+) \cdot (I^-) = 5 \cdot 10^{-12}$$

selectivity as against copper is achieved.

The selectivity of precious metal precipitation as against lead in predominantly lead-containing chloride solutions is effected in the same manner as that described for copper. The danger of an excess of iodide is removed in that way, so that the simultaneous precipitation of PbI$_2$ according to solubility product is ruled out.

$$K_s = (Pb^{2+}) \cdot (I^-)^2 = 10^{-8}$$

The suspension, obtained after the third step, is then subjected to solid-liquid separation for the purpose of separating the precious metal containing solids. Although this process step is not specific to the process in accordance with the present invention, filtration of the whole suspension without any previous thickneneing step is preferable for the purpose of obtaining a filtered solution which is completely free from solids, so that the precious metal yield is not impaired by imperfect solid-liquid separation. On the other hand, a precoat layer as a filtering medium is preferably not used for this fine filtration because the separated solids are diluted through the presence of precoat layer constituents.

Subsequent to solid-liquid separation the solids, containing activated carbon, silver, gold, and iodide in accordance with the present invention, are dried in the known manner. There is preferred for the drying operation a process in which there occur no dust losses, and in which the essential constituents in the solids, e.g. the iodide or the activated carbon, are not decomposed.

The dried solids are subsequently subjected to reduction melting for the purpose of converting the precious metals silver and/or gold into a precious metal regulus. For recovering the iodide compound, added in the third step described above, the solids are admixed with a suitable iodide bonder. If an alkali iodide compound serves as an iodide compound, the iodide bonder used is the oxide, hydroxide or carbonate of the same alkali metal.

Reduction melting is described by Reaction (2):

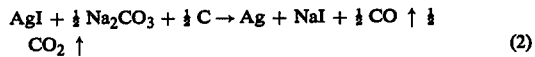
(2)

Thus, the silver and gold present in the solids is conveyed into the precious metal regulus.

The iodide bonder — sodium carbonate in the case of Reaction (2)—admixed with the solids only for the purpose of recovering the iodide, is added in amounts of 100 to 150%, preferably 110 to 130% of the stoichiometry related to the iodide content in the precious-metal-containing solids, according to Reaction (2).

The activated carbon present in the precious-metal-containing solids, serves as a reducer. It has the significant advantage of containing only an insignificant amount of gangue (95.6% C., 2.5% CaO, 0.4% SiO$_2$, 0.3% MgO, 0.3% Al$_2$O$_3$, 0.05% S), so that the temperature during melting can be kept relatively low without the viscosity of the iodide-containing slag phase being increased.

The amount of reducer to be added varies with the constituents present in the precious-metal-containing solids and to be subjected to reduction. Related to the silver content and/or gold content, the amount of reducer to be added is about one to three times the stoichiometry according to Reaction (2), preferably two to three times. If smaller amounts are added, the precious metals, it is true, are completely reduced to metal, but the recovery of iodide in the slag phase is incomplete on account of the formation of highly volatile iodide compounds.

If more than three times the amount is added, separation of the metal regulus phase from the iodide-containing slag phase is incomplete on account of higher viscosity of the slag phase, which is to be ascribed to the presence of too high an excess of unreacted carbon. In general, the optimum amount of reducer to be added depends upon the kind of melting process and has to be determined experimentally in each case.

If the activated carbon, present in the dried solids and added in the first step of the process in accordance with the present invention, should be insufficient as a reducer for the metling process, the missing amount of reducer is simultaneously added to the dried solids. Any reducer can be used at this point: however, it should be low in slagging constituents.

The melting unit preferably used is an indirectly fired furnace in which any contact between the melt and the flue gas and flue dust is prevented.

Subsequent to the melting process, the metal regulus phase is separated from the slag phase by means of sedimentation in a suitable unit, and it is then conveyed into a suitable casting mould desired for further treatment. The slag phase is treated in the conventional manner in order to obtain a solid, finely distributed mixture of the recovered iodide and excess of activated carbon.

For the production of the aqueous iodide solution to be added again in the third step, the above-mentioned finely distributed mixture is subjected to leaching with water. Thus, the recovered iodide is conveyed into an aqueous solution which, subsequent to the activated-carbon residue being separated, is used for being introduced into the third step of the process in accordance with the present invention. In order to offset any iodide losses that may occur, fresh iodide in the form of alkali-iodide compound is added to the aqueous iodide solution prior to being introduced into the third step.

Subsequent to being separately or jointly dried with the precious-metal-containing solids obtained in the third step of the process in accordance with the present invention, the activated-carbon residue from the aqueous solution is recycled to the melting process for the purpose of recovering the precious metals which are still present in the activated-carbon phase on account of their insufficient sedimentation behaviour in the melting phase.

Hence, the process in accordance with the present invention for selectively recovering silver and/or gold from predominantly chloride solutions represents an integrated separation process which is characterized by a high minimum consumption of auxiliary materials on account of the recovery of these auxiliary materials, and by the absence of any points at which intermediate and waste products occur.

Compared with the prior art described initially, the process in accordance with the present invention does not have the disadvantages mentioned above since the precious metals silver and/or gold are selectively separated from the solution as against one or more of the metal ions, possibly present, of copper, lead, zinc, nickel, cobalt, iron, magnesium, and aluminum; the recovery of the precious metals is as good as quantitative; the two precious metals behave similarly towards the process applied; further treatment is simple and the economy of the process is not impaired by the further treatment of the precious metals.

The invention, as described herein, is represented in the accompanying drawing which is a flow sheet for the process.

The following examples are to illustrate the process according to the present invention without limiting it thereto.

EXAMPLE 1

This example illustrates the recovery of silver and gold in the form of a precipitate from a solution obtained by leaching pyrites cinders resulting from chlorinating sulphatizing roasting. In order to remove the solids, contained in it, the leach is subjected to oxidizing pretreatment with chlorine gas at 40° C. and with additions of limestone, with the limestone being added in order to obtain a pH value of 3.0, and with the chlorine gas being added in order always to have a small amount of dissolved chlorine in the leach during pretreatment, thus preventing any simultaneous precipitation of reduced gold. The potential value amounts to about 900 to 1000 mV as against the saturated calomel electrode. After separation of the solids being formed, i.e. gypsum, ferric hydroxide, and silicic acid, the practically solids-free leach is first acidified with hydrochloric acid up to a pH value of 2.0 and then subjected to the process in accordance with the present invention for recovering the silver and the gold.

This leach, having a temperature of 40° C., a pH value of 2.0, and a potential value of 930 mV as against the calomel electrode, has the following composition in g/l:

| | Cu | Zn | Pb | $SO_4^{2-}$ | $Cl^-$ | Ag | Au | $Na^+$ |
|---|---|---|---|---|---|---|---|---|
| g/l | 26.2 | 45.4 | 0.6 | 141 | 93 | 0.095 | 0.0005 | rest |

Initially, as a first treatment step, there are added to 2 l of this leach, 0.03 g of finely distributed activated carbon with a specific surface of 650 m²/g. The amount added approximately corresponds to 30 times the amount of gold. After the first step, the potential is insignificantly decreased on account of the addition of 15 mg/l of activated carbon, while the dissolved gold still amounts to 0.43 mg/l.

In the second step, with 1.2 g of zinc dust being added, the potential of the leach is decreased to 350 mV as against the calomel electrode, there being partial precipitation of the gold and none of the silver at all. The leach contains 1.5 g/l Cu(I)⁺, 0.30 mg/l Au, which means a precipitation of only 40% of the gold, and still 95 mg/l of silver.

In the third step, 15.1 ml of a 20 g/l NaI-containing aqueous solution are added to the leach reduced to 350 mV. The amount of iodide added corresponds to 115% of the stoichiometric amount for the bonding of the silver iodide. After being stirred at 40° C. for 10 minutes, the suspension with solids content of 0.225 g/l is filtered. The filtrate contains 1.9 mg/l silver and less than 0.01 mg/l gold, that is to say, 98% Ag and more than 98% gold are extracted.

The dried solids have the following compositions:

| | Cu | Zn | Pb | Ag | Au | C | $I^-$ |
|---|---|---|---|---|---|---|---|
| % | 3.8 | <0.1 | <0.01 | 37.4 | 0.22 | 6.7 | rest |

The selectivity of the process can clearly be seen from the following Table:

Table:

| | Ratio in the Leach | Ratio in the Precipitate | Enrichment Factor |
|---|---|---|---|
| Ag/Cu | 0.0036 | 9.84 | 2,733 |
| Au/Cu | 0.000019 | 0.06 | 3,158 |

EXAMPLE 2

This example illustrates the recovery of a precious-metal regulus by means of reduction remelting of a precipitate as described in Example 1. The precipitate, mainly consisting of silver iodide and activated carbon, is subjected to reduction melting with soda as an iodide bonder at 1100° C. in an indirectly fired furnace. The retention time amounts to 30 minutes. In accordance with Reaction (2) the amount of soda added amounts to 130% of the stocihiometric amount, related to the iodide content in the precipitate. As the activated-carbon content already corresponds to 300% of the stoichiometric amount, related to the silver according to Reaction (2), no additional reducer is added. Afer phase separation and cooling there are obtained as products the precious-metal regulus and a slag phase from which, after leaching with water, there is obtained the residual activated carbon suspended in the recovered aqueous sodium iodide solution.

The following table shows the amounts and compositions of the starting products and of the final products:

| | Charged Precipitate | Added Iodide Bonder ($Na_2CO_3$) | Precious Metal Regulus | Residual Activated Carbon | Iodide Solution Obtained |
|---|---|---|---|---|---|
| Amount (g) (l) | 70 g | 19 g | 28.2 g | 3.5 g | 0.5 L |
| Ag (%) | 40.5 | — | 96.4 | 21.2 | — |
| Distribution, % | 100 | — | 95.9 | 2.6 | — |
| Au (%) | 0.67 | — | 1.62 | 0.49 | — |
| Distribution, % | 100 | — | 97.4 | 3.6 | — |
| $I^-$ (%) (g/l) | 50.5% | — | — | — | 72.4 g/l |
| Distribution, % | 100 | — | — | — | 102.4 |
| C (%) | 6.8 | — | — | 72 | — |
| Distribution, % | 100 | — | — | 53 | — |

Hence, there is recovered from a precipitate of the composition

| | Cu | Ag | Au | $I^-$ | $Cl^-$ |
|---|---|---|---|---|---|
| % | 0.39 | 40.5 | 0.67 | 50.5 | 1.1 | a regulus of the composition

| | Cu | Ag | Au |
|---|---|---|---|
| % | 0.69 | 96.4 | 1.62 |

The yield of Ag and Au in the regulus amounts to 95.9% and 97.4%, respectively, while the residual Ag and Au are present in the residual activated carbon and are extracted in a later run after recycling. There was no evidence of any iodide losses in this test.

EXAMPLE 3

This example illustrates the effect of the potential upon the selectivity of the silver-gold separation from the copper. In the process in accordance with the present invention 2 l of a copper chloride solution of the composition in g/l:

|  | Cu | $Cu^{2+}$ total | NaCl | $Cl^-$ | Ag | Au total | pH |
|---|---|---|---|---|---|---|---|
| g/l | 44 | 44 | 254 | 203 | 0.6 | 0.01 | 2.0 | are treated at 40° C. with dissolved chlorine and a potential of 1050 mV as against the calomel electrode. Initially, in the first step (a), 0.1 g/l of activated carbon is added. Subsequently, in the second step (b), there is reduction with zinc dust, there being three different amounts added until three different potential values are obtained, i.e. 450, 425, and 400 mV, as well as the corresponding $Cu^+$ concentrations. In the third step (c) there are added at 40° C. 0.05 l/l of a 20 g/l NaI solution.

The pH value and the potential value remain unchanged. The addition of iodide, related to the silver, amounts to 119 to 135% of the stoichiometry according to Reaction (1).

The test conditions can be seen from the table.

The results in the table show that the precious-metal yield increases with decreasing potential values, with the selectivity as against copper decreasing considerably at the same time. At 450 mV the excess of iodide is lost through decomposition, while at 400 mV it is bonded as cuprous iodide. Example 3 clearly shows that, in order to obtain a sufficient precious-metal yield with high selectivity, it is necessary for the potential in the second step to be so adjusted that, while the aqueous iodide solution is being added in the third step, there occurs no substantial decomposition of the iodide added.

|  |  | Example 3a | Example 3b | Example 3c |
|---|---|---|---|---|
| Starting Solution |  |  |  |  |
| Ag Concentration | mg/l | 604 | 556 | 532 |
| Au Concentration | mg/l | 11.1 | 10.0 | 10.2 |
| Potential (Calomel) | mV | 980 | 1060 | 1040 |
| First Step |  |  |  |  |
| Activated Carbon Added | g/l | 0.1 | 0.1 | 0.1 |
| Ratio of Activated Carbon: Cold |  | 9.0 | 10 | 9.8 |
| Potential (Calomel) | mV | 750 | 1050 | 1020 |
| Ag Concentration | mg/l | — | 556 | 519 |
| Au Concentration | mg/l | — | 4.1 | 7.1 |
| Second Step |  |  |  |  |
| Zinc Dust Added | g/l | 0.4 | 1.7 | 3.00 |
| Potential (Calomel) | mV | 450 | 425 | 400 |
| $Cu^+$ Concentration | g/l | 1.10 | 1.37 | 6.2 |
| Ag Concentration | mg/l | — | — | 516 |
| Au Concentration | mg/l | — | — | 0.6 |
| Third Step |  |  |  |  |
| NaI (20 g/l) Added | g/l | 0.05 | 0.05 | 0.05 |
| Stoichiometry According to Reaction (1) | % | 119 | 129 | 135 |
| Ag Concentration | mg/l | 13.9 | 3.6 | 1.7 |
| Au Concentration | mg/l | 0.40 | 0.40 | 0.14 |
| Solids Concentration | g/l | 1.43 | 1.43 | 1.69 |
| Composition of Precipitate |  |  |  |  |
| Ag | % | 41.2 | 38.6 | 31.4 |
| Au | % | 0.77 | 0.66 | 0.59 |
| Cu | % | 0.39 | 2.81 | 8.45 |
| C | % | 7.0 | 7.0 | 5.9 |
| $I^-$ | % | 49.2 | 50.9 | 53.5 |
| Yield |  |  |  |  |
| Ag | % | 97.7 | 99.4 | 99.7 |
| Au | % | 95.7 | 96.0 | 98.6 |
| Selectivity |  |  |  |  |
| Ratio in the Leach | Ag:Cu | 0.014 | 0.013 | 0.012 |
|  | Au:Cu | 0.00025 | 0.00023 | 0.00023 |
| Ratio in the Precipitate | Ag:Cu | 105.6 | 13.6 | 3.72 |
|  | Au:Cu | 1.97 | 0.23 | 0.070 |
| Enrichment Factor as against Copper | Ag | 7543 | 1046 | 310 |
|  | Au | 7880 | 1000 | 304 |

EXAMPLE 4

This example is identical with Example 3c with the exception of the addition of iodide, which is effected in portions, so that the course of the gold precipitation can be more clearly seen.

| Iodide Added l/l | % of Stoichiometry, Related to Ag According to Reaction (1) | Gold Concentration mg/l | Precipitation % |
|---|---|---|---|
| 0 | 0 | 0.6 | 94.1 |
| 0.021 | 50 | <0.02 | >99.8 |
| 0.042 | 100 | 0.02 | 99.8 |
| 0.050 | 120 | 0.14 | 98.6 |

This example unequivocally shows that the addition of iodide is necessary for the gold to be completely precipitated, but that in the presence of an excess of iodide the gold yield is decreased again, probably on account of a gold complex formation with iodide.

EXAMPLE 5

(a) A chloride solution, predominantly containing Pb and thus contrasting with the solutions in Examples 1 to 4, has the following composition (g/l):

| Pb | Cu | Zn | Fe | Ag | Au | NaCl | pH |
|----|----|----|----|------|---------|-----|-----|
| 7 | 2 | 0.2 | 1 | 0.086 | 0.00034 | 250 | 1.5 |

It is subjected at 40° C. to treatment by the process in accordance with the present invention.

After saturation with $Cl_2$ there are first added 2 l of this solution 20 mg of activated carbon; then the solution is reduced with $SO_2$ gas to a potential value of 350 mV as against the calomel electrode; and, finally, 18 ml of a 20 g/l NaI solution are added at a pH value of 1.5. The suspension is filtered after being stirred for five minutes. After separation of the precious-metal-containing solids (0.2 g/l) the final solution contains 3.8 mg/l Ag precious-metal yield in the precipitate and <0.02 mg/l Au, respectively, which corresponds to a precious-metal yield in the precipitate of 95.6% Ag and 94.1% Au, respectively. The residue from precipitation has the following composition:

|   | Ag | Au | Pb | Cu | Zn | Fe | Na | C |   |
|---|----|----|----|----|----|----|----|----|----|
| % | 42 | 0.16 | 0.25 | 2.6 | 0.1 | 0.6 | 1.2 | 5.1 | rest |

The selectivity of the recovery of the precious metals as against the lead can be seen from the following table:

|  | Ratio in the Leach | Ratio in the Precipitate | Enrichment Factor |
|---|---|---|---|
| Ag:Pb | 0.0123 | 168.8 | 13,723 |
| Au:Pb | 0.000049 | 0.64 | 13,142 |

(b) A Pb-containing iodide solution as in Example 5a, but with different Pb, Ag, and Au values (13.5 g/l Pb, 0.090 g/l Ag, and 0.000024 g/l Au), is treated as in Example 5a. After separation of the precipitate (0.28 g/l), the final solution contains 4.4 mg/l Ag and <0.02 mg/l Au, respectively, which corresponds to a precious-metal yield in the precipitate of 95.1% Ag and >92% Au, respectively. However, the unwashed precipitate contains 17.8% Pb which, according to a microstructure analysis, is present as $PbCl_2$ crystallized out. After washing the precipitate with water at 40° C., there are only 1.8% Pb left in the precious-metal precipitate. The washing water, however, contains 93% of the Pb and only 0.46% of the Ag and 1.8% of the Au of the original precipitate.

This example shows that, if the precious-metal precipitate has a higher Pb content on account of the $PbCl_2$ being crystallized out, the lead can be selectively removed without difficulty by means of the lead chloride being washed with water; thus the selectivity of the process is preserved.

What is claimed is:

1. Process for selectively separating precious metal selected from the group consisting of gold, silver and mixtures thereof from a chloride solution of the precious metal and other heavy metal, the other heavy metal being the main constituent of the solution, which comprises:

(a) adding to the solution finely divided activated carbon for reduction of gold in solution to gold metal and absorption of the gold metal by the carbon, thereafter, (b) adding an aqueous solution of an iodine compound for selective precipitation of further precious metal and the formation of an admixture of the precipitated metal in the solution, (c) the pH of the solution during steps (a) and (b) being such that hydrolysis with the metal ions does not occur, (d) the potential of the solution during step (b) being such that no substantial decomposition of the iodine compound occurs, (e) separating the precipitated precious metal and active carbon from the admixture formed in step (b), drying the separated precious metal and active carbon and admixing the dry product with an iodine binder and subjecting the resulting admixture to reduction for formation of a regulus containing the precious metal.

2. Process according to claim 1, wherein said other heavy metal includes at least one from the group consisting of copper, lead, zinc, nickel, cobalt, iron, magnesium, and aluminum.

3. Process of claim 1, wherein the main constituent in the chloride solution is lead.

4. Process of claim 1, wherein the main constituent in the chloride solution is copper.

5. Process of claim 1, wherein said pH value is kept below 3.0.

6. Process of claim 1, wherein said potential of the solution is provided by adding a reducer to the solution after step (a) and before step (b).

7. Process of claim 6, wherein there is a reducer which does not form or leave after reaction with the solution any solid substantial solid residue.

8. Process of claim 6, wherein the reducer is at least one from the group consisting of sulphur dioxide, zinc dust, and iron dust.

9. Process of claim 6, wherein the reducer is the aqueous iodide solution used in the third step.

10. Process of claim 1, wherein the temperature of the chloride solution in step (b) is below 50° C. and above the crystallization temperature of the solution.

11. Process of claim 7, wherein said temperature is below 40° C.

12. Process of claim 1, wherein the iodide compound is an alkali iodide.

13. Process of claim 1, wherein the amount of activated carbon added in step (a) is at least 5 times the gold concentration in the chloride solution.

14. Process as set forth in claim 1, wherein the amount of iodide added in step (b) is 100 to 150% the amount stoichiometrically equal to the silver.

15. Process of claim 1, wherein said precious metal is gold and the chloride solution is free of silver, and the amount of iodide added in step (b) is up to 100% the amount stoichiometrically equal to the gold.

16. Process as set forth in claim 1, wherein the iodine binder is at least one of alkali oxide, alkali hydroxide and alkali carbonate.

17. Process of claim 1, wherein the solution contains sulphate ions and is a predominately chloride solution.

18. Process of claim 1, wherein said pH of the solution is between 1.0 and 2.0.

19. Process of claim 1, wherein the amount of activated carbon added in step (a) is 10 to 30 times the gold concentration in the chloride solution.

20. Process of claim 1, wherein the amount of iodide added in step (b) is 110 to 120% the amount stoichiometrically equal to the silver.

21. Process of claim 1, wherein said precious metal is gold and the chloride solution is free of silver, and the amount of iodide added in step (b) is 50 to 100% the amount stoichiometrically equal to the gold.

22. Process of claim 1, wherein the precious metal is silver and gold.

23. Process of claim 1, wherein said precious metal is silver and gold, the pH value is kept below 3.0, the temperature of the chloride solution in step (b) is below 50° C. and above the crystallization temperature of the solution, the iodide compound is an alkali iodide, wherein the amount of activated carbon added in step (a) is at least 5 times the gold concentration in the chloride solution, and the amount of iodide added in step (b) is 100 to 150% the amount stoichiometrically equal to the silver.

* * * * *

UNITED STATES PATENT AND TRADEMARK OFFICE
CERTIFICATE OF CORRECTION

PATENT NO. : 4,131,454
DATED : December 26, 1978
INVENTOR(S) : Norbert L. Piret, Meinolf Hopper and Herbert Kudelka It is certified that error appears in the above-identified patent and that said Letters Patent are hereby corrected as shown below:

Col. 9, line 34, change "$SO^{2-}$" to --$SO_4^{2-}$--;

Col. 10, table between lines 41-54, last column, line 1, change "0.5L" to -- 0.5 1 --;

Col. 12, the first table, under "First Step", line 3, change "Cold" to --Gold--;

Col. 12, the first table, under "Second Step", line 1, change "3.00" to --3.05--;

Col. 13, second table, line 27, last column, insert -- $I^-$ -- above "rest".

Signed and Sealed this

Eighth Day of May 1979

[SEAL]

Attest:

RUTH C. MASON
*Attesting Officer*

DONALD W. BANNER
*Commissioner of Patents and Trademarks*